US007603870B2

(12) United States Patent
Mavridis et al.

(10) Patent No.: US 7,603,870 B2
(45) Date of Patent: Oct. 20, 2009

(54) AUTOMATED MACHINE FOR MAKING SEMI-FROZEN BEVERAGES

(75) Inventors: Vasilios Mavridis, Attikis (GR);
Theoharis Georgiadis, Dallas, TX (US);
Harry E. Haas, Overland Park, KS (US); Kenneth A. Miller, Merriam, KS (US)

(73) Assignee: Toskany International, LLC, Overland Park, KS (US)

( * ) Notice: Subject to any disclaimer, the term of this patent is extended or adjusted under 35 U.S.C. 154(b) by 326 days.

(21) Appl. No.: 11/584,729

(22) Filed: Oct. 20, 2006

(65) Prior Publication Data

US 2008/0092580 A1  Apr. 24, 2008

(51) Int. Cl.
*A23G 90/20* (2006.01)
(52) U.S. Cl. .............................. 62/136; 62/342; 474/84
(58) Field of Classification Search .................. 62/68,
62/136, 342, 487.1; 206/497; 220/1.5, 254.3,
220/592.2; 222/146
See application file for complete search history.

(56) References Cited

U.S. PATENT DOCUMENTS

| 3,545,063 | A | * | 12/1970 | Mitchell | .................. 29/890.07 |
| 4,531,380 | A | * | 7/1985 | Hagen | .......................... 62/320 |
| 5,094,358 | A | * | 3/1992 | Serio, Sr. | ..................... 220/315 |
| 5,394,715 | A | * | 3/1995 | Guerette | ...................... 70/177 |
| 6,286,724 | B1 | * | 9/2001 | Midden | ................. 222/153.14 |
| 6,490,872 | B1 | * | 12/2002 | Beck et al. | ..................... 62/66 |
| 6,619,056 | B2 | * | 9/2003 | Midden et al. | ................ 62/136 |

* cited by examiner

*Primary Examiner*—Frantz F Jules
*Assistant Examiner*—Emmanuel Duke
(74) *Attorney, Agent, or Firm*—Mark E. Brown

(57) ABSTRACT

An automated machine for making semi-frozen beverages includes a bowl system with a chamber and a dispensing assembly. A mixing system includes an auger rotatably received in said chamber and a dispensing assembly. A drive assembly includes a motor drivingly connected to a flexible drive belt connected to and adapted for driving the auger. A refrigeration system includes a compressor, a condenser and an evaporator cylinder for receiving refrigerant from a compressor. The evaporator cylinder is located within the auger. A consistency control mechanism controls a valve for discontinuing the flow of refrigerant to the evaporator cylinder when the product reaches a desired consistency.

9 Claims, 13 Drawing Sheets

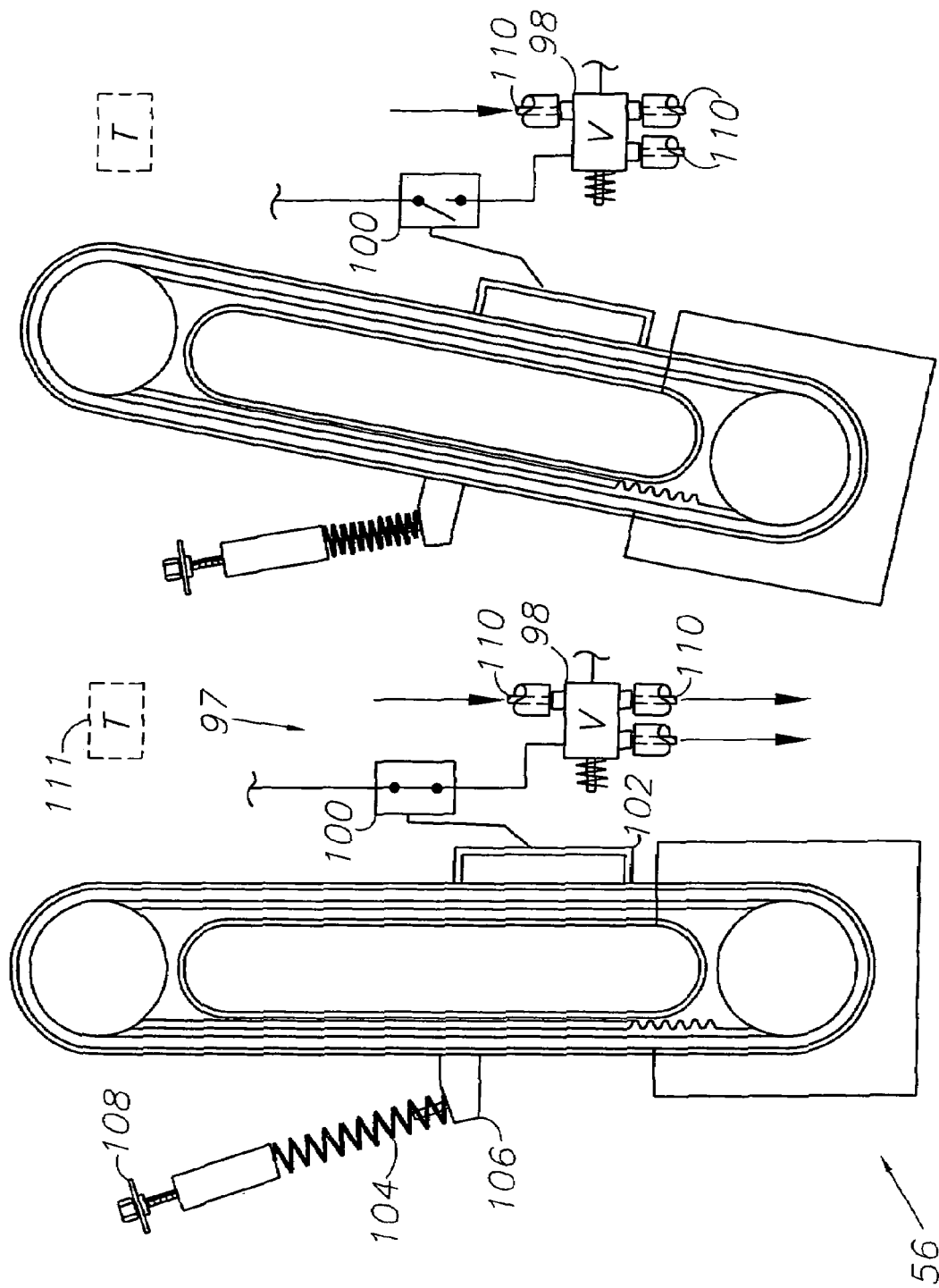

AUTOMATED MACHINE FOR MAKING SEMI-FROZEN BEVERAGES

BACKGROUND OF THE INVENTION

1. Field of the Invention

The present invention relates generally to beverage machines, and in particular to an automated machine for making semi-frozen beverages.

2. Description of the Related Art

Semi-frozen beverages are very popular. A wide variety of flavors are available at commercial establishments. Nonalcoholic, semi-frozen beverages are commonly made from fruit juices, flavorings, sweeteners and other ingredients, which are typically blended, mixed and/or stirred to produce slush-like consistencies. An advantage of such beverages is that they can be served and consumed without adding ice. Therefore, semi-frozen beverages tend to be popular with commercial establishments such as convenience stores and fast-food restaurants, which can quickly and efficiently dispense them in significant quantities.

Alcoholic semi-frozen beverages are also very popular. Little or no skill or training is necessary to operate the automated equipment for producing semi-frozen beverages. Moreover, significant commercial quantities can be produced in volume, as opposed to mixing drinks individually. Sales of significant commercial quantities can thus be efficiently achieved. Therefore, semi-frozen beverages tend to be popular with operators and patrons of commercial drinking establishments.

Semi-frozen beverages are also popular in noncommercial settings, including private residences. Previous equipment for making semi-frozen beverages has tended to be less efficient and less reliable than the present invention. Heretofore there has not been available an automated machine for making semi-frozen beverages with the advantages and features of the present invention.

SUMMARY OF THE INVENTION

In the practice of an aspect of the present invention, a machine is provided for making and dispensing semi-frozen beverages. The machine includes a bowl system, which can include one or more bowls, each having a lower, mixing chamber and an upper chamber. A dispensing assembly is mounted on each bowl and includes a valve, which can be opened and closed by an operator to dispense the bowl contents. A mixing system includes an auger rotatably mounted in the bowl lower chamber. A drive belt assembly is connected to the auger and includes a motor for rotating same through a drive belt. A refrigeration system includes a compressor and a condenser, which are mounted in a base cabinet. An evaporator cylinder receives refrigerant from the compressor and is mounted in the bowl lower chamber within the auger. The evaporator cylinder lowers the temperature of the bowl contents to a desired semi-frozen, slush-like consistency for mixing and discharge by the auger and the dispensing valve. The dispensing valve can be secured by an optional locking mechanism.

BRIEF DESCRIPTION OF THE DRAWINGS

FIG. 8 is a rear elevational view of a drive belt assembly embodying another aspect of the present invention with a modified compressor control switch, shown in a closed, "compressor on" position.

FIG. 9 is another rear elevational view thereof, shown with the compressor control switch in an open, "compressor off" position.

DETAILED DESCRIPTION OF THE PREFERRED EMBODIMENTS

I. Introduction and Environment

Figure 1:
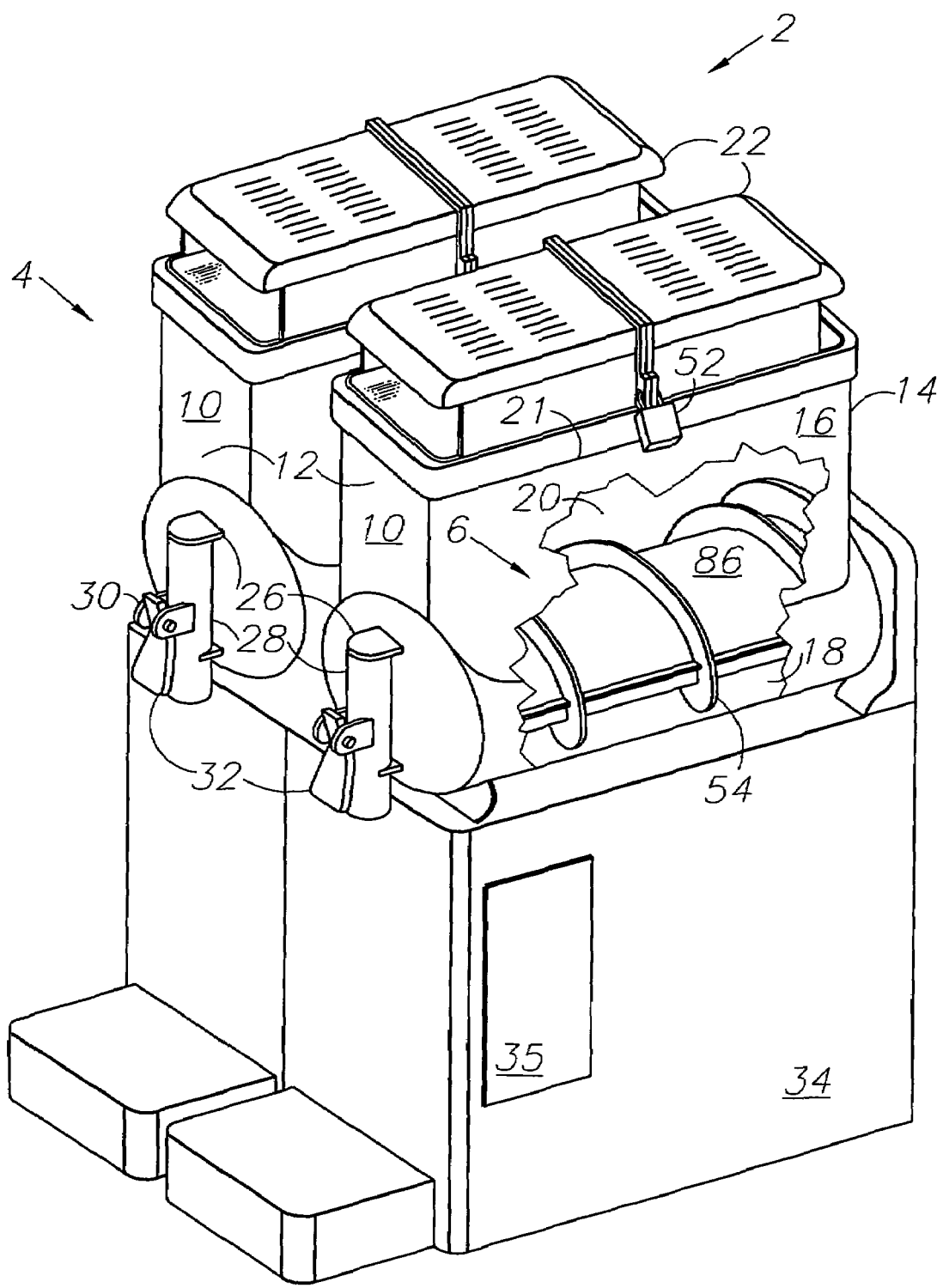
FIG. 1 is an upper, front, right side perspective view of an automated machine for making semi-frozen beverages embodying an aspect of the present invention.
Figure 2:
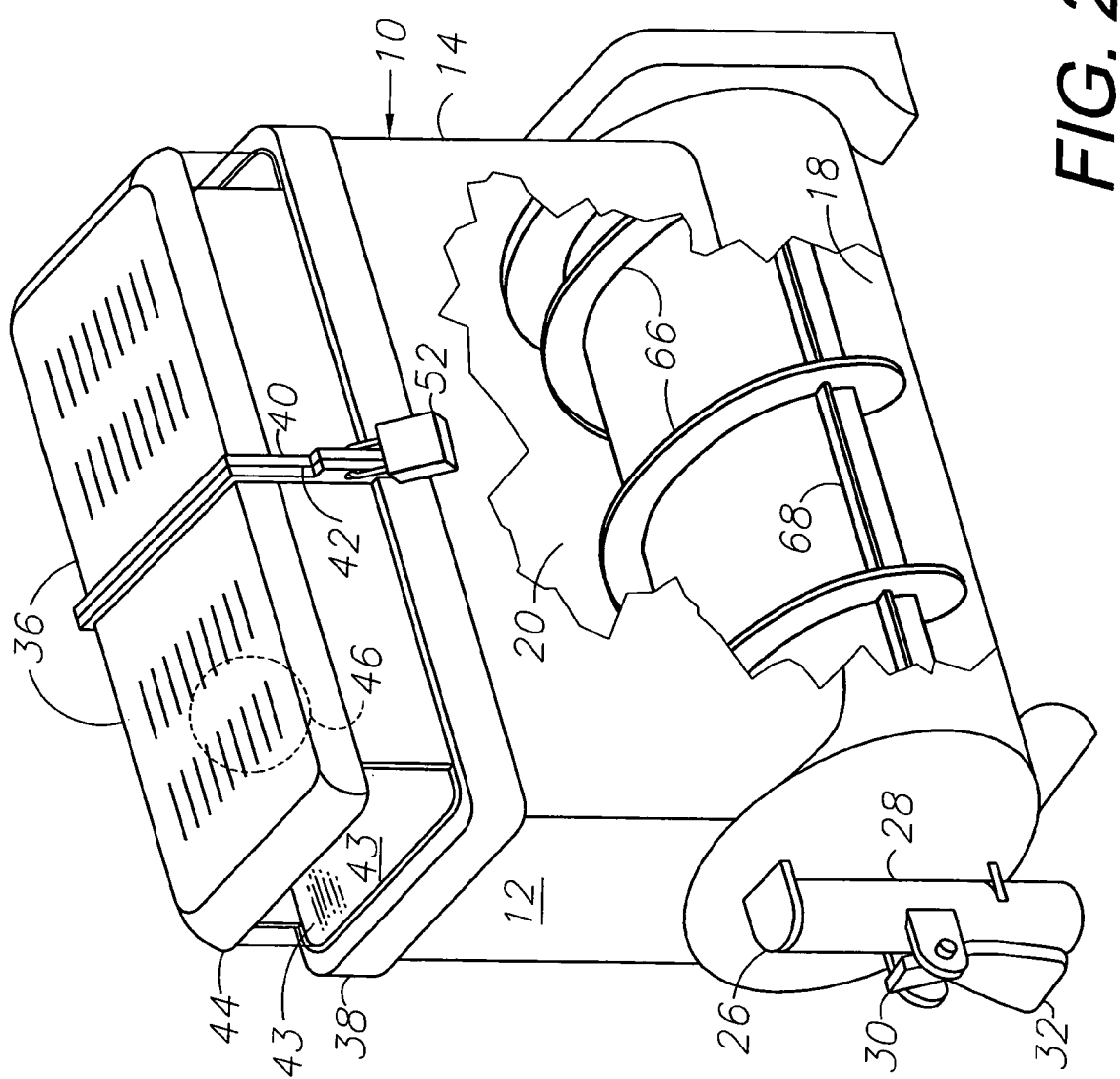
FIG. 2 is a fragmentary, perspective view thereof.
Figure 3:
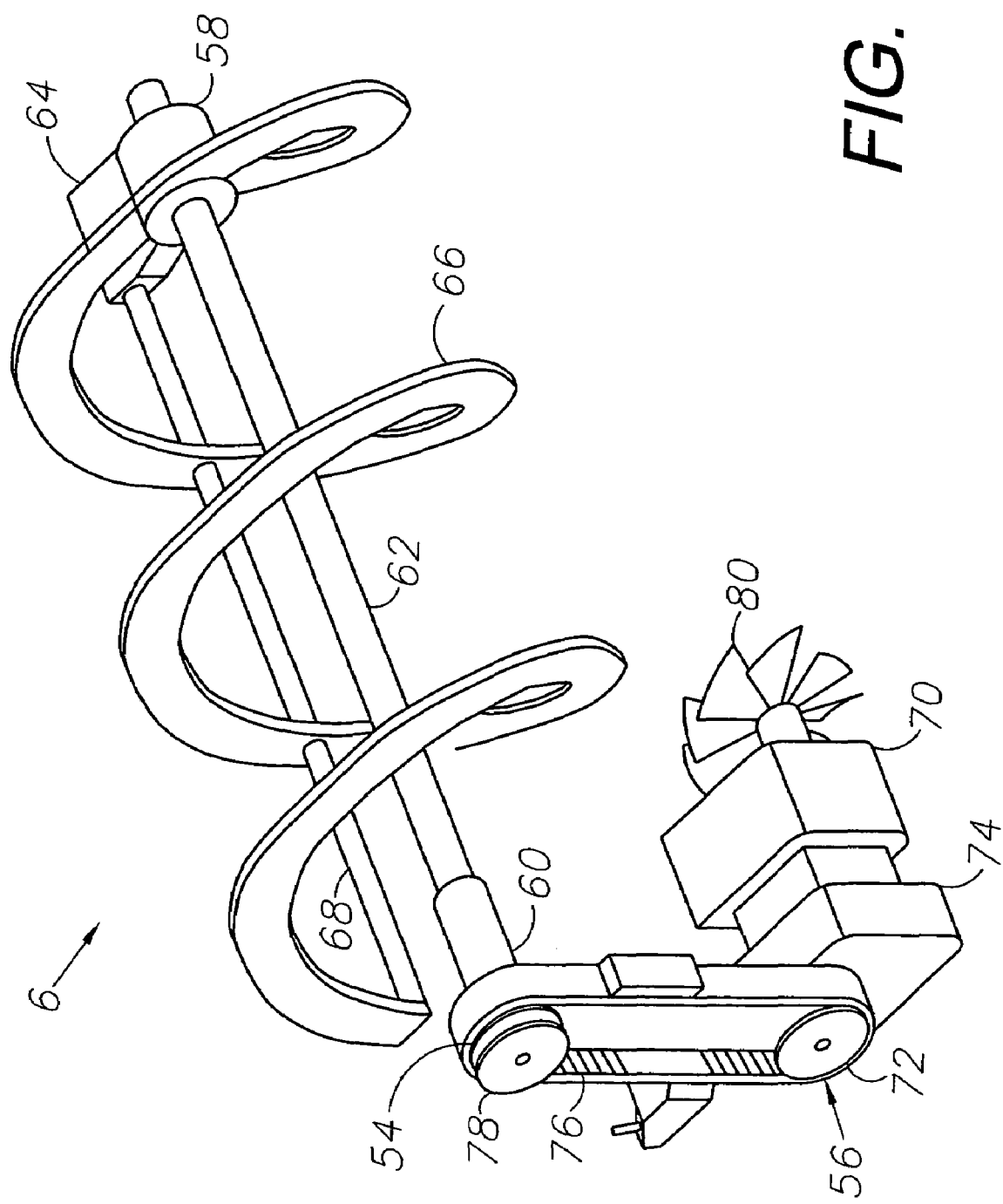
FIG. 3 is another fragmentary, perspective view, particularly showing auger and drive belt assemblies thereof.
Figure 4:
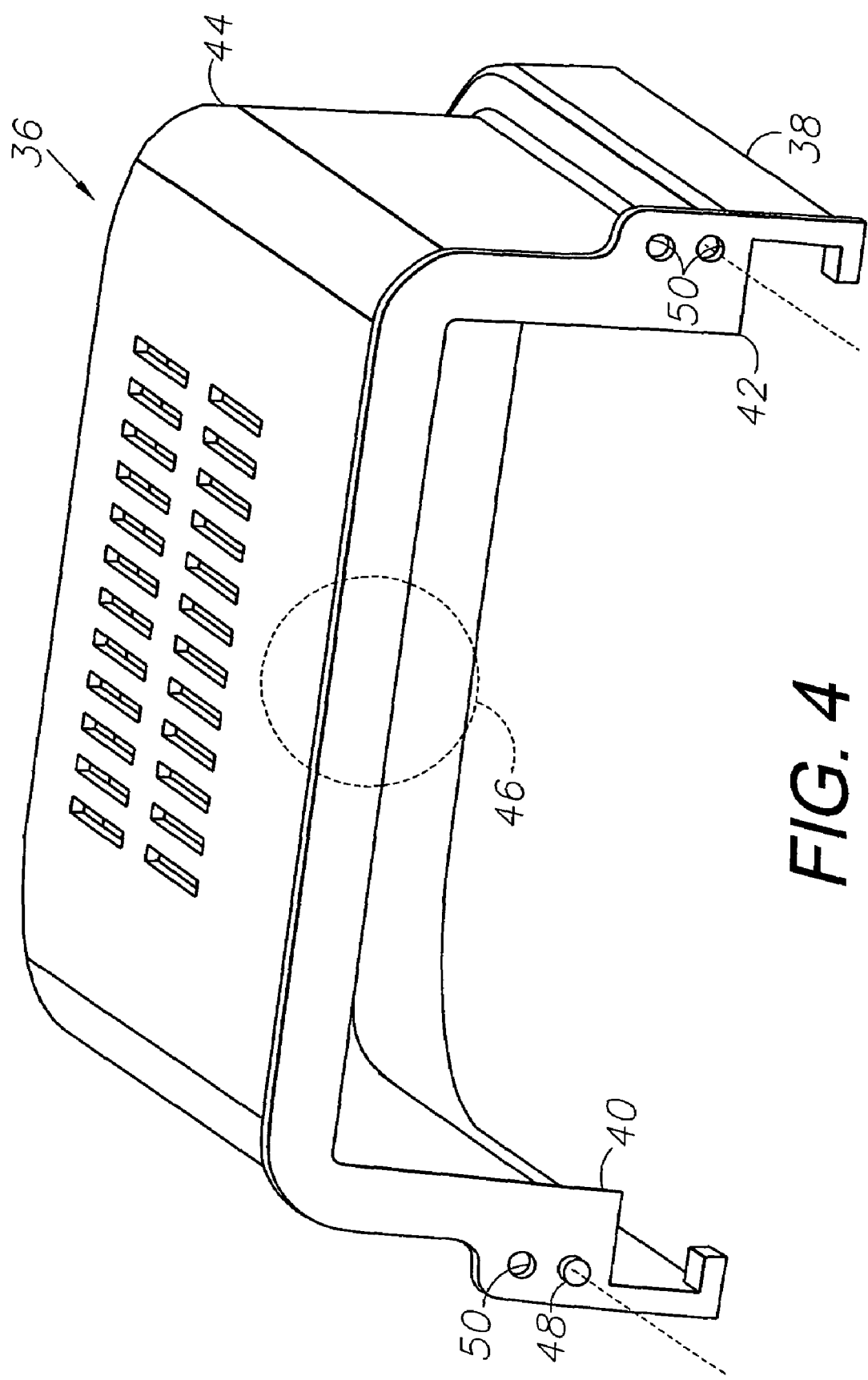
FIG. 4 is a perspective view of a lid half thereof.
Figure 5:
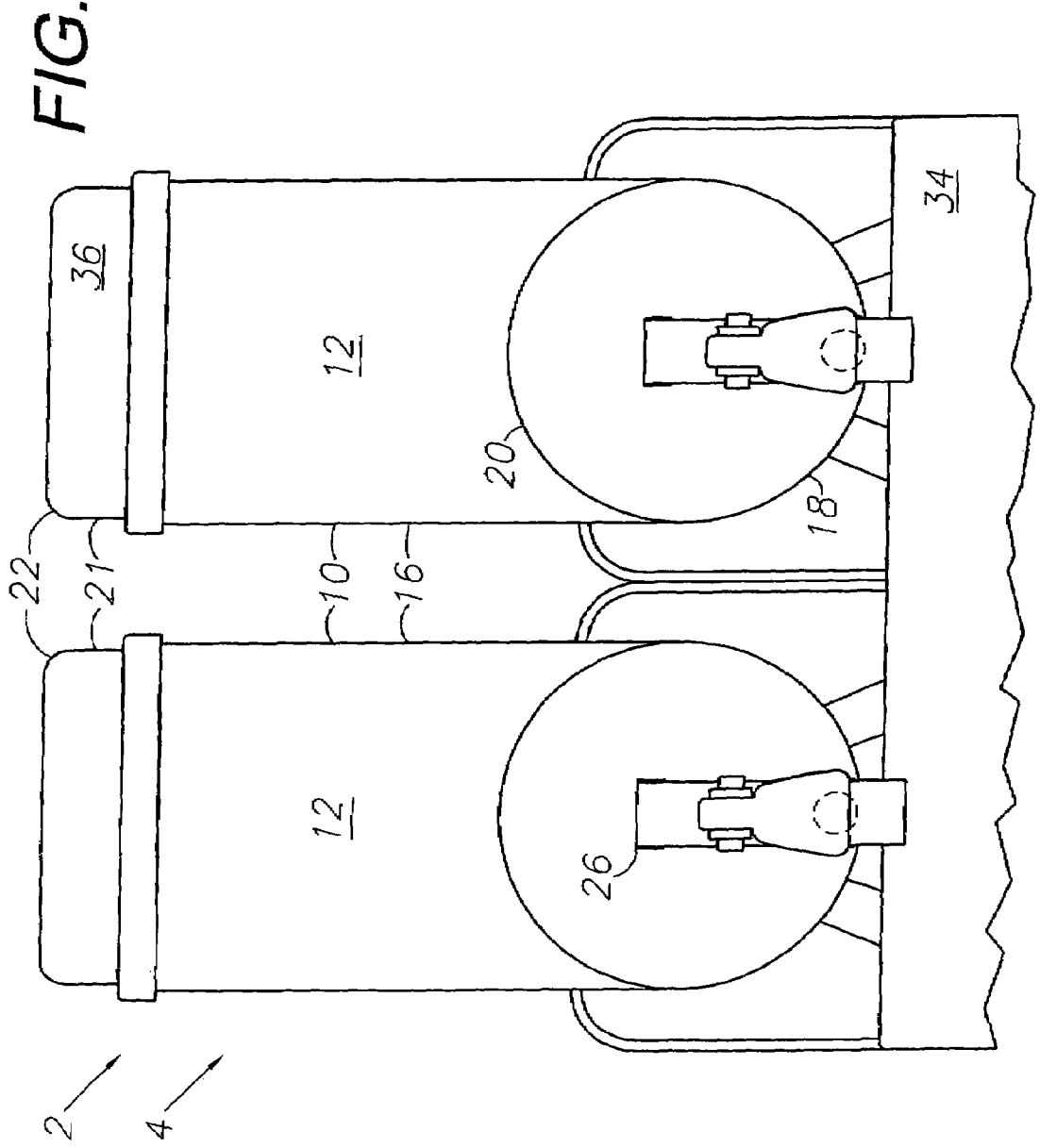
FIG. 5 is a fragmentary, front elevational view thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Certain terminology will be used in the following description for convenience in reference only and will not be limiting. Said terminology will include the words specifically mentioned, derivatives thereof and words of similar meaning.

Referring to the drawings in more detail, the reference numeral 2 generally designates an automated semi-frozen beverage machine embodying an aspect of the present invention. The machine 2 generally includes a bowl system 4, a mixing system 6 and a refrigeration system 8.

II. Bowl System 4

The bowl system 4 can comprise one or more bowls 10 (e.g., two are shown), each including: front and back ends 12, 14; opposite sides 16; a lower, mixing/dispensing chamber 18; and an upper chamber 20 open at a top 21 mounting a cover or lid assembly 22. The lower, mixing/dispensing chamber 18 has a generally cylindrical configuration. A dispensing assembly 26 is mounted on the mixing/dispensing chamber 18 at the bowl 10 front end 12. The dispensing assembly 26 includes a generally vertically-oriented discharge tube, selectively communicating with the mixing/dispensing chamber 18 via a valve 30, which can be manually operated by a valve lever 32. It will be appreciated that various valve structures can be utilized with the automated beverage machine 2 of the present invention. For example, an automated, solenoid-activated valve could be provided and connected to a suitable controller for automating the operation of the machine 2.

The bowls 10 are mounted on a suitable base cabinet 34, which is adapted for housing some of the components of the refrigeration system 8. The bowls 10 preferably comprise a clear or transparent plastic material whereby their contents and the operation of the mixing system 6 can be readily observed.

Each cover/lid assembly 22 includes a pair of lid halves 36. Each lid half 36 includes a rim 38, which fits over the top 21 of a respective bowl 10, and further includes a mating flange 40 at a lid half inner end 42 and a clear lens 43 at a lid half outer end 44. Each lid half 36 is adapted for mounting an internal light source 46, which is adapted for backlighting the lens 43. The lenses 43 can be provided with suitable advertising, promotional and instructional material and information, which can be utilized to promote sales of the semi-frozen beverage. The lid halves include respective pins 48, which project from respective flanges 40 and are received in receivers 50, which are formed in the lid half flanges 40 in opposing relation to the pins 48. The flanges 40 include additional receivers 50, which receive padlocks 52 whereby the contents of the bowls can be secured and access thereto restricted to authorized personnel.

III. Mixing System 6

The mixing system 6 generally comprises an auger assembly 54 located in the lower, mixing chamber 18 of each bowl 10 and a drive belt assembly 56. The auger assembly 54 includes a front and back bearings 58, 60 connected to the bowl front and back ends 12, 14 and a coaxial drive shaft 62 extending therebetween. A crank arm 64 extends from the front bearing 58 and is connected to helical auger flighting 66, which mounts a sweep bar 68 positioned in parallel, spaced relation to the drive shaft 62. The drive belt assembly 56 includes a motor 70 drivingly connected to a lower gear 72 via a suitable gearbox 74, which drives a toothed belt 76, which rotates the drive shaft 62 via an upper gear 78.

Figure 12:
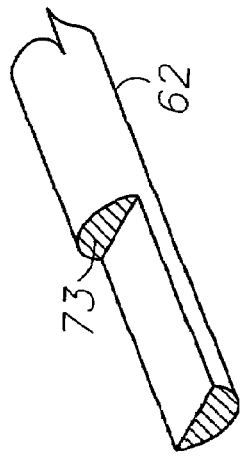
FIG. 12 is a perspective view of the rear end of the auger drive shaft.
Figure 11:
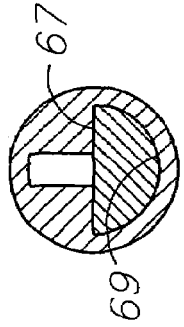
FIG. 11 is an enlarged, vertical, cross-sectional view of an auger drive shaft inserted into a drive axle of the bearing assembly, taken generally along line 11 in FIG. 10.
Figure 10:
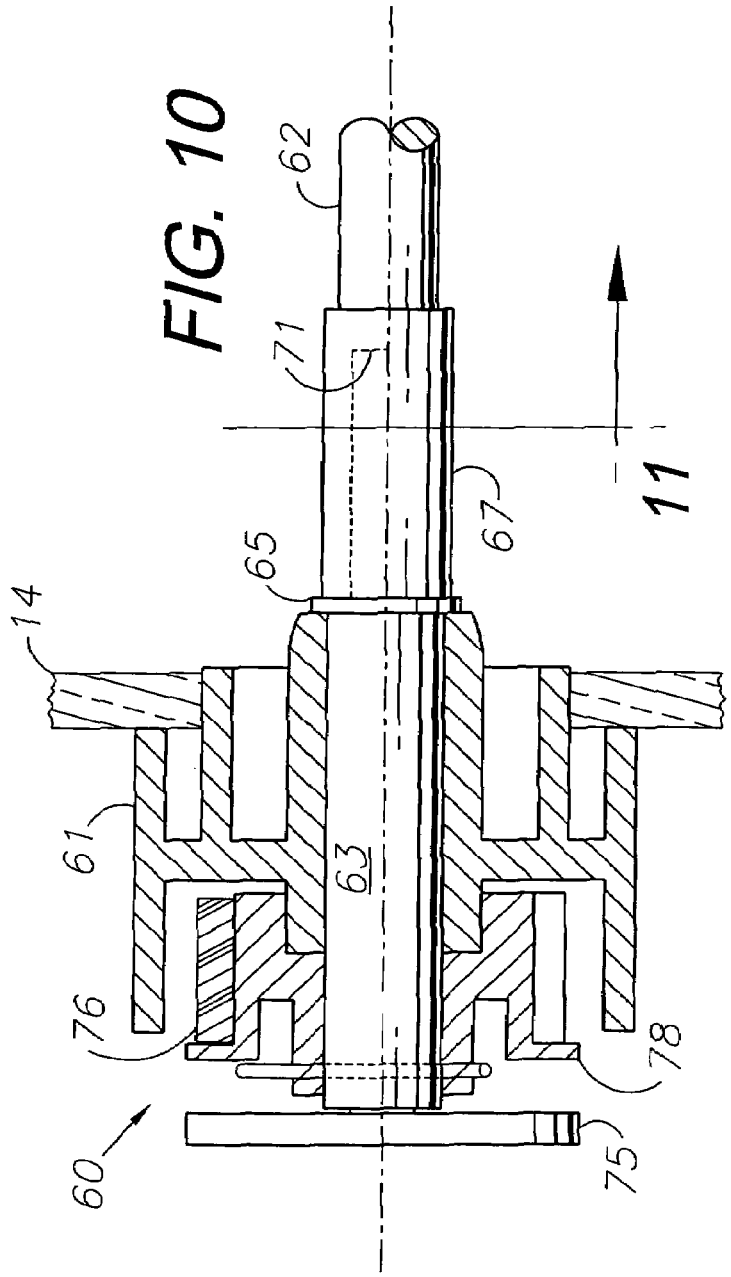
FIG. 10 is an enlarged, vertical, cross-sectional view of a rear bearing assembly thereof.

The back bearing 60 includes a bushing 61, which extends through the bowl back end 14 and rotatably receives a drive axle 63 including a collar 65 engaging the bushing 61 and an inner coupling 67 (FIG. 10). The drive axle coupling 67 has a receiver 69 with a semicircular cross-sectional configuration (FIG. 11) and a step 71, which corresponds to the configuration of the back end of the drive shaft 62, including a step 73 (FIG. 12). An end cap 77 is placed on the end of the drive axle 63 and extends into the drive axle receiver 69. A Cotter pin 75 extends through the upper gear 78, the end cap 77 and the drive axle 63.

The motor 70 mounts a cooling fan 80 and can be provided with suitable overload protection for preventing damage to the drive belt assembly 56. A back cover 79 is placed over the back of the machine 2 and covers the drive belt assemblies 56 and other components of the machine 2, which can be accessed by removing the back cover 79.

IV. Refrigeration System 8

Figure 6:
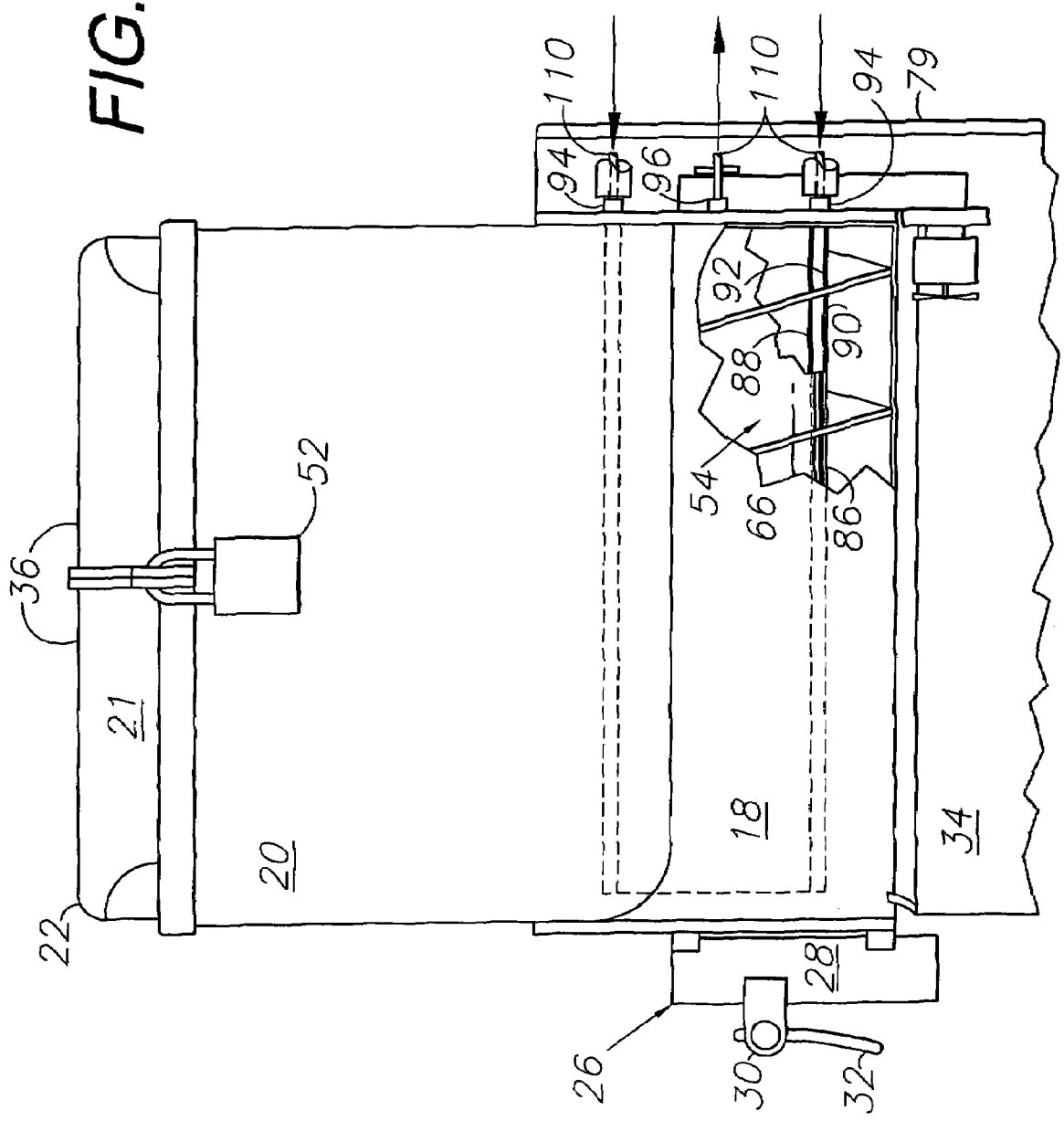
FIG. 6 is a fragmentary, side elevational view thereof.
Figure 7:
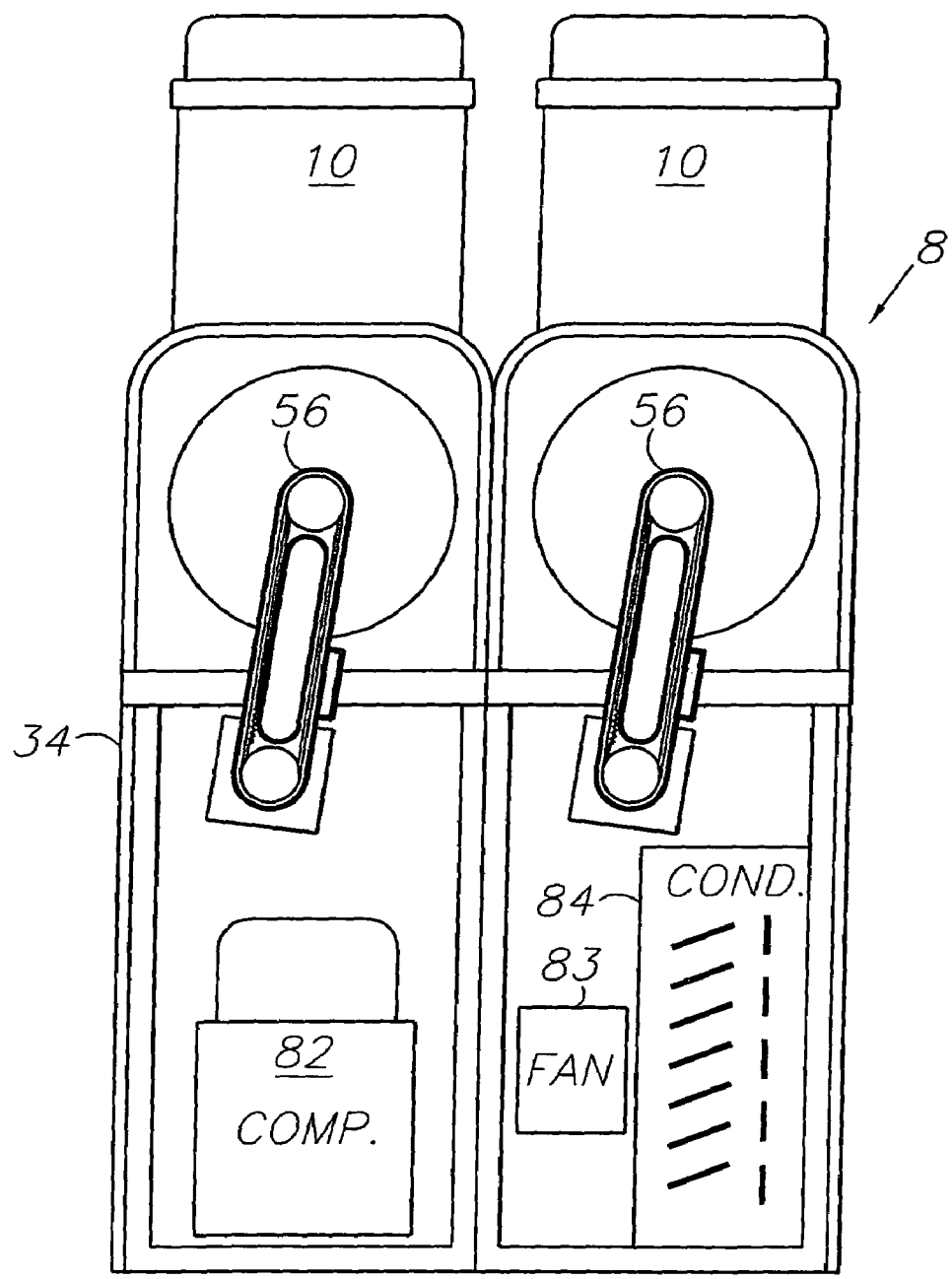
FIG. 7 is a rear elevational view, particularly showing a refrigeration system thereof.

The refrigeration system 8 includes a compressor 82 and condenser coils 84 mounted in the base cabinet 34. A fan 83 is directed to the condenser coils 84. An evaporator cylinder 86 comprises inner and outer coaxial tubes 88, 90, which form an expansion/evaporation chamber 92 therebetween receiving refrigerant from the compressor 82 through inlet ports 94 and discharging same to the condenser coils 84 through an outlet port 96. One or more inlet ports 94 (two are shown in FIG. 6) can be located as needed around the expansion/evaporation chamber 92 at the bowl back end 14 in order to effectively and efficiently distribute refrigerant therein.

A product consistency control mechanism 97 includes a solenoid-activated refrigerant valve 98 interposed between the compressor 82 and the evaporator cylinder inlet port 94. The valve 98 is activated by a microswitch 100, which is located adjacent to a boss 102 on the drive belt assembly 56. The drive belt assembly 56 is adapted for swinging through a limited range of rotational movement whereby the boss 102 closes the microswitch 100 and refrigerant flows to the evaporator cylinder 86 in normal operation. When product in the mixing chamber 18 becomes too cold and exceeds a desired semi-frozen consistency, it exerts a backforce on the auger 54, which causes the drive belt assembly 56 to swing clockwise and open the microswitch 100. The solenoid valve 98 then closes, blocking the flow of refrigerant to the evaporator cylinder 86. The product gradually thaws to its desired semi-frozen consistency, whereupon the backforce reduces until a drive belt assembly return spring 104 overcomes the backforce and swings the drive belt assembly 56 counterclockwise to a refrigerating position and the cycle repeats. The drive belt return spring 104 is compressed between a spring boss 106 and a threadably-adjustable spring compression mechanism 108. The compression mechanism 108 enables an operator to adjust the consistency of the product by precompressing the drive belt return spring 104. Greater compression increases the coldness and hardness of the semi-frozen product and vice versa. Conduits 110 are provided for distributing refrigerant among the components of the refrigeration system 8 and can be insulated as necessary.

As an alternative to the consistency mechanism 97, the refrigeration system 8 can be controlled based on the temperature of the product in the bowls 10. For example, thermostats 111 (shown in dashed lines in FIGS. 8 and 9) can be used in lieu of the microswitches 100 for controlling the refrigerant valves 98 in response to product temperature, which can be sensed directly or indirectly, e.g. with infrared temperature sensing equipment.

V. Locking Systems 112, 132

Figure 13:
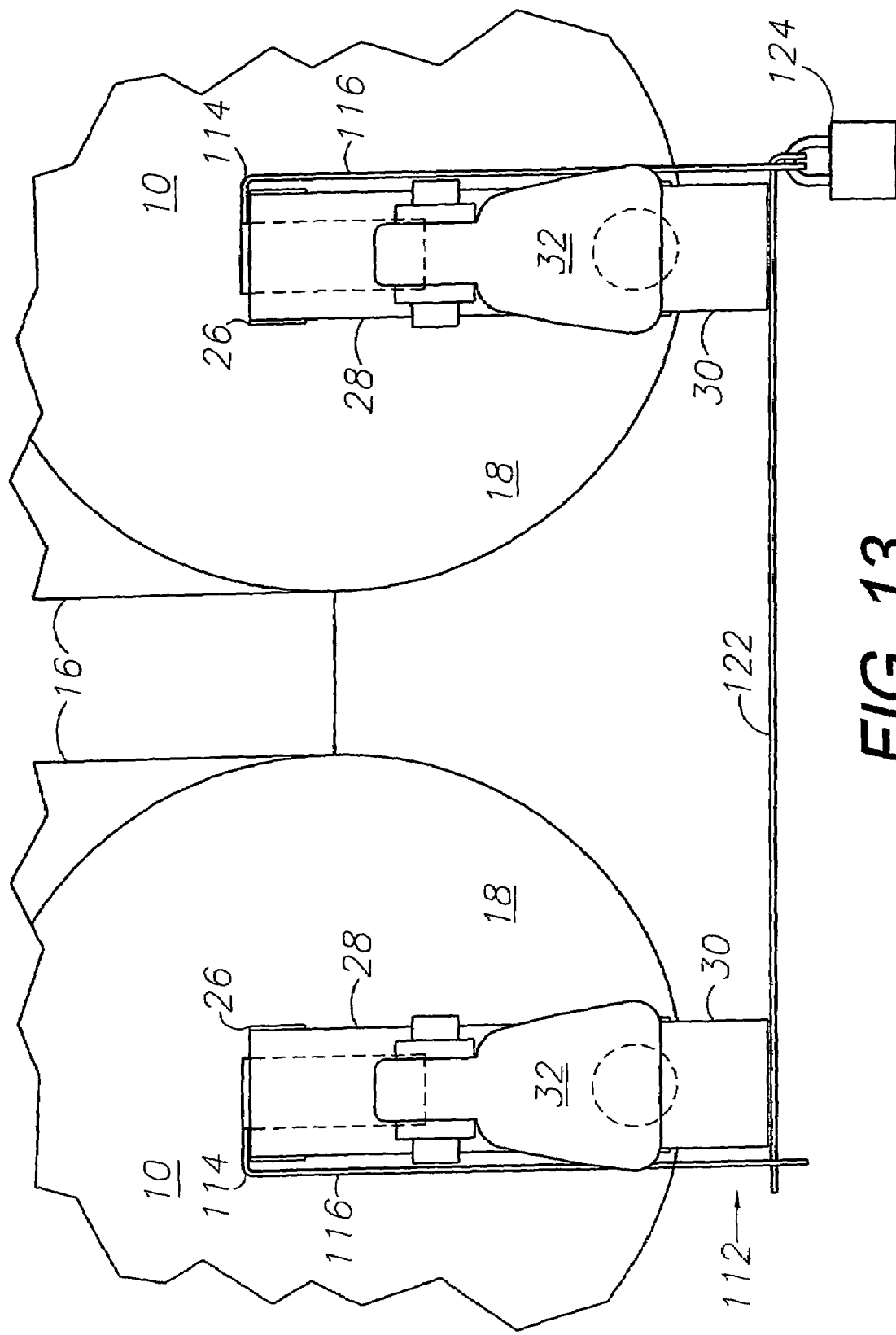
FIG. 13 is a fragmentary, front elevational view particularly showing a locking system thereof.
Figure 14:
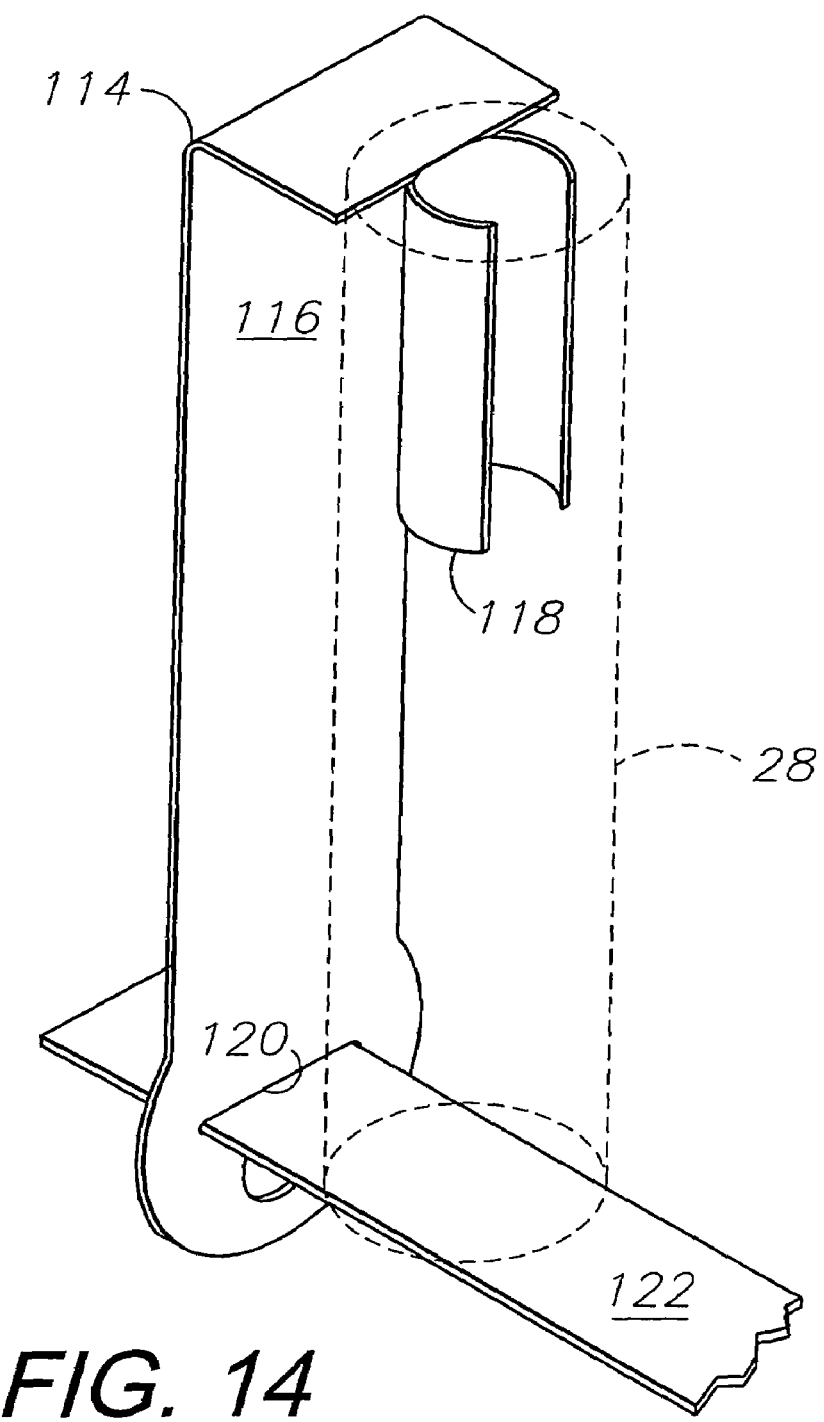
FIG. 14 is a perspective view of a retainer of the locking system positioned in a dispensing tube, which is shown in dashed lines.

FIGS. 13 and 14 show a dual-plate locking system 112, which includes a pair of dispenser retainers 114 each having a plate 116 adapted for placement alongside a respective dispensing tube 28 and further having an insert 118 adapted for insertion into a respective dispensing tube 28 whereby the dispensing valve 30 is retained in a closed position (FIG. 14). Each plate 116 has a slot 120 at its lower end. With the retainers 114 in place, the slots 120 are located immediately below the lower ends of a dispensing tubes 28 whereby a bar 122 can be slid through the slots 120 and secured to one of the plates 116 by a suitable padlock 124. In this locked configuration (FIG. 13), neither dispensing valve lever 32 can be raised and the contents of the machine 2 are secured. Similar retainers can be provided for individually securing single-bowl machines or either of the bowls 10 of the machine 2 shown.

Figure 15:
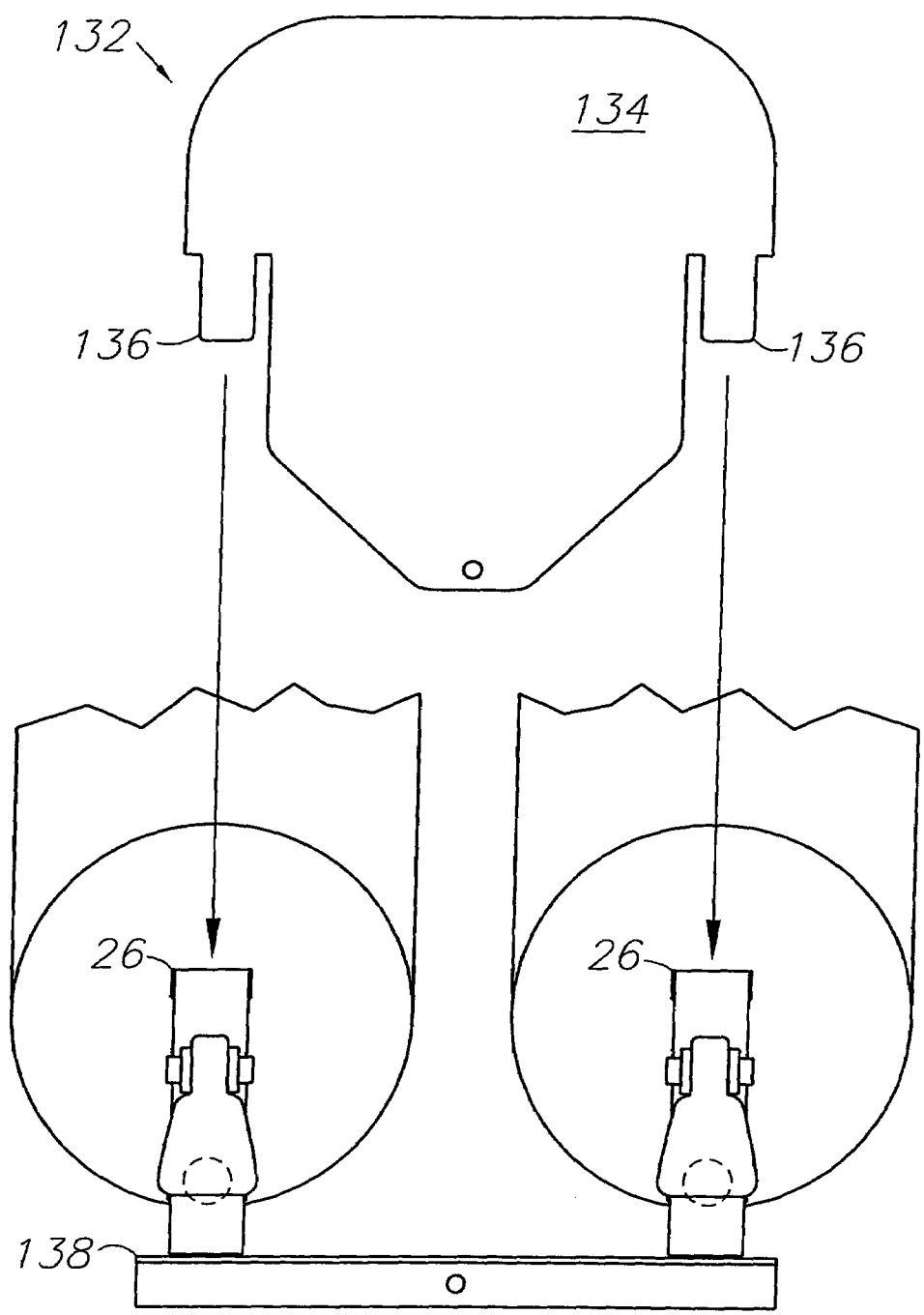
FIG. 15 is a fragmentary, front elevational view particularly showing a modified locking system.
Figure 16:
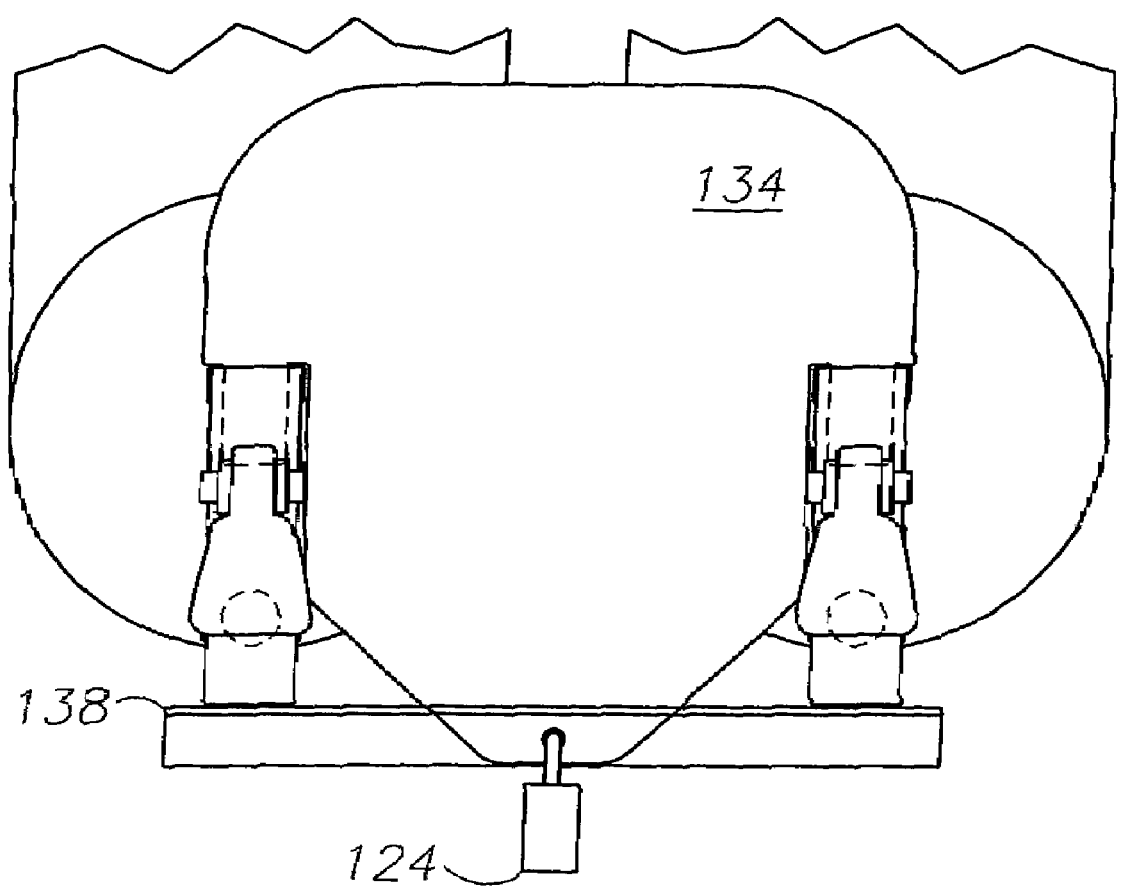
FIG. 16 is a fragmentary, front elevational view particularly showing the modified locking system in a locked position.

FIGS. 15 and 16 show a single-plate locking system 132, which comprises an alternative to the locking system 112 described above. The single-plate locking system 132 includes a plate 134 with a pair of inserts or fingers 136, which extend into the dispensing tubes 28 in a locked configuration. An angle-section member 138 receives the plate 134 at its lower end and is attached thereto by a padlock 124. The angle-section member 138 engages the lower ends of the dispensing tubes 28 in the locked position, thus securing the contents of the bowls 10.

It is to be understood that the invention can be embodied in various forms, and is not to be limited to the examples discussed above. Other components and configurations can be utilized in the practice of the present invention.

Having thus described the invention, what is claimed as new and desired to be secured by Letters Patent is:

1. An automated machine for making semi-frozen beverages, which machine includes:
   a bowl system including an upper chamber with an open top, a lower chamber open to and positioned below said upper chamber, a lid assembly including first and second lid halves removably placed on said upper chamber top and adapted for closing same and each said lid half having inner and outer ends and a dispensing assembly including a dispensing tube communicating with said lower chamber and a valve having an open position opening said dispensing tube and a closed position closing said dispensing tube;
   a mixing system including an auger assembly rotatably received in said lower chamber, a drive assembly coupled to said auger assembly for rotating same, a rotational axis about which said auger assembly rotates and said auger assembly including helical fighting forming a central, coaxial receiver receiving said evaporator cylinder;
   a refrigeration system including: an evaporator cylinder positioned in said lower chamber in said auger assembly receiver, said evaporator cylinder having inner and outer tubes and an expansion/evaporation space therebetween for receiving said refrigerant; a compressor; a condenser; said evaporator cylinder receiving refrigerant from said compressor and said condenser receiving refrigerant from said cylinder; a refrigeration control connected to said compressor and including a sensor for sensing a temperature or viscosity of the chamber contents and controlling the flow of refrigerant to said evaporator cylinder in response thereto;
   a torque resistance assembly connected to said drive assembly and activated in response to a viscosity of said chamber contents, said torque resistance assembly comprising said drive assembly being rotatably mounted with respect to said bowl system, said torque resistance assembly being deflectable from a first position to a second position with respect to a vertical axis of the auger and adapted for rotating with respect to said rotational axis between first and second positions, said torque resistance assembly including a switch mounted on said bowl system in contact with said drive assembly and having open and closed positions corresponding to said drive assembly first and second positions respectively;
   a refrigerant line extending from said compressor to said evaporator cylinder; and
   a solenoid valve in said refrigerant line, said solenoid valve having an open position corresponding to said switch closed position and a closed position corresponding to said switch open position.

2. The machine according to claim 1 wherein said auger assembly includes:
   a crank arm connected to said drive shaft front end and extending laterally therefrom; and
   a sweep bar extending generally parallel to said rotational axis and connected to said crank arm and to multiple flights of said fighting.

3. The machine according to claim 1 wherein said drive assembly includes:
   a motor;
   a first gear connected to said motor;
   a second gear connected to said drive shaft back end; and
   a drive belt drivingly connecting said first and second gears.

4. The machine according to claim 1 wherein said auger assembly includes:
   a drive shaft coaxial with said rotational axis and having front and back ends;
   front and back bearings connected to said bowl and rotatably receiving said drive shaft front and back ends respectively; and
   said drive shaft back and being drivingly connected to said drive assembly.

5. The machine according to claim 1, which includes:
   a dispensing assembly lock system with locked and unlocked configurations and including a retainer with an insert received in said dispensing tube in said locked configuration;
   a bar engaging a lower end of said dispensing tube in said locked configuration; and
   a lock adapted for locking said bar to said retainer in said locked configuration.

6. The machine according to claim 5 wherein said dispensing assembly includes:
   an operating lever adapted for opening and closing said valve; and
   said lock system immobilizing said valve in said locked configuration.

7. An automated machine for making semi-frozen beverages, which machine includes:
   a bowl system including an upper chamber with an open top and a lower chamber open to and positioned below said upper chamber;
   said bowl system further including a lid assembly with first and second lid halves removably placed on said upper chamber top and adapted for closing same, each said lid half having inner and outer ends and a mating flange on said inner end, a lock, a locked position with said mating flanges locked together in abutting relation by said lock with said lid assembly placed on said upper chamber top;
   said bowl system further including a dispensing assembly including a dispensing tube communicating with said lower chamber and a valve having a closed position closing said tube and an open position opening said tube for discharging the contents of said chamber;
   a mixing system including an auger assembly rotatably received in said lower chamber and a drive assembly coupled to said auger assembly for rotating same; a rotational axis about which said auger assembly rotates;
   helical fighting forming a central, coaxial receiver receiving said evaporator cylinder;
   a drive shaft coaxial with said rotational axis and having front and back ends;
   front and back bearings connected to said bowl and rotatably receiving said drive shaft front and back ends respectively;
   a crank arm connected to said chive shaft front end and extending laterally therefrom;
   a sweep bar extending generally parallel to said rotational axis and connected to said crank arm and to multiple flights of said fighting;
   said drive shaft back end being drivingly connected to said drive assembly;

said drive assembly including: a motor; a first gear connected to said motor; a second gear connected to said drive shaft back end; and a drive belt drivingly connecting said first and second gears;

a refrigeration system including: an evaporator cylinder positioned in said chamber, said evaporator cylinder having inner and outer tubes and an expansion/evaporation space therebetween for receiving said refrigerant; a compressor; and a condenser, said evaporator cylinder receiving refrigerant from said compressor and said condenser receiving refrigerant from said cylinder;

said refrigeration system further including a refrigeration control connected to said compressor and including a sensor for sensing a temperature or viscosity of the chamber contents and controlling the flow of refrigerant to said expansion cylinder in response thereto; said sensor comprising a torque resistance assembly connected to said drive assembly and activated in response to a viscosity of said chamber contents, said torque resistance assembly comprising said drive assembly being rotatably mounted with respect to said bowl system and adapted for rotating with respect to said rotational axis between first and second positions, said torque resistance assembly including a switch mounted on said bowl system in contact with said drive assembly and having open and closed positions corresponding to said drive assembly first and second positions respectively;

a refrigerant line extending from said compressor to said evaporator cylinder; and a solenoid valve in said refrigerant line, said solenoid valve having an open position corresponding to said switch closed position and a closed position corresponding to said switch open position.

8. The machine according to claim 7, which includes:

first and second bowl systems and mixing systems;

a base cabinet with said refrigeration system and said mixing system motors located therein;

a control panel mounted on said base cabinet and including controls for said mixing and refrigeration systems; and said bowl and mixing systems being mounted in juxtaposed relation on said base cabinet.

9. The machine according to claim 8, which includes a locking system with:

locked and unlocked configurations;

a plate including first and second inserts adapted for positioning in said dispensing assemblies in said locked configuration;

a bar engaging said dispensing tubes in said locked configuration;

a lock locking said bar to said plate in said locked configuration;

each said dispensing system including an operating lever adapted for opening and closing said valve; and said lock system immobilizing said valve in said locked configuration.

* * * * *